United States Patent
Kodama

(10) Patent No.: US 7,204,642 B2
(45) Date of Patent: Apr. 17, 2007

(54) SPINDLE MOTOR

(75) Inventor: Mitsuo Kodama, Fujieda (JP)

(73) Assignee: Victor Company of Japan, Ltd., Yokohama (JP)

( * ) Notice: Subject to any disclaimer, the term of this patent is extended or adjusted under 35 U.S.C. 154(b) by 88 days.

(21) Appl. No.: 11/085,156

(22) Filed: Mar. 22, 2005

(65) Prior Publication Data

US 2006/0002639 A1 Jan. 5, 2006

(30) Foreign Application Priority Data

Jun. 30, 2004 (JP) ............................ 2004-192921

(51) Int. Cl.
*F16C 32/06* (2006.01)
(52) U.S. Cl. ...................... 384/107; 384/119
(58) Field of Classification Search ................ 384/100, 384/107, 119, 132
See application file for complete search history.

(56) References Cited

U.S. PATENT DOCUMENTS 6,781,268 B2 * 8/2004 Oku ........................... 384/132
6,836,388 B2 * 12/2004 Nishimura et al. ....... 360/99.08

FOREIGN PATENT DOCUMENTS

JP 2002 054636 2/2002

* cited by examiner

*Primary Examiner*—Thomas R. Hannon
(74) *Attorney, Agent, or Firm*—Connolly Bove Lodge & Hutz LLP

(57) ABSTRACT

A spindle motor (80) is composed of a sleeve (5), a shaft (1) that is rotatably sustained by the sleeve (5) in a radial direction through a dynamic pressure bearing (20) containing lubricant (12), and a hub (3) that is fixed to the shaft (1). The hub (3) has a raised section (11) in a ring shape that surrounds one end portion of the sleeve (3). The spindle motor (80) is provided with a taper seal section (14) for the lubricant (12) between an outer circumferential surface (10) of the one end portion of the sleeve (5) and an inner circumferential surface (13) of the raised section (11), which confronts the outer circumferential surface (10) of the sleeve (5), wherein a gap between these surfaces (10, 13) increases in accordance with a distance from the one end portion of the sleeve (5), and formed with a reservoir (25) for the lubricant (12) between an end surface (5d) of the one end portion of the sleeve (5) and a surface (3d) of the hub (3) that confronts the end surface (5d), wherein the end surface (5d) is in parallel with the surface (3d) with maintaining a prescribed gap (g) between them.

1 Claim, 4 Drawing Sheets

SPINDLE MOTOR

BACKGROUND OF THE INVENTION

1. Field of the Invention

The present invention relates to a spindle motor, which is suitably used in an apparatus installed with a hard disc or a laser beam printer.

2. Description of the Related Art

FIG. 6 is a cross sectional view of a conventional spindle motor according to the prior art. The conventional spindle motor has been used in an apparatus installed with a hard disc (hereinafter referred to as hard disc apparatus).

In FIG. 6, the conventional spindle motor is composed of a rotor 150R and a stator 150S. The rotor 150R is further composed of a shaft 101, a thrust plate 102 in disciform that is fixed to an end portion of the shaft 101, a hub 103 that is fixed to another end portion of the shaft 101, and a magnet 104 in a cylindrical shape that is magnetized in multi-magnetic poles and fixed to an inner circumferential surface of the hub 103.

On the other hand, the stator 150S is composed of a sleeve 105 in a cylindrical shape into which the shaft 101 is inserted so as to be rotatable freely, a thrust cover 106 in a flat plate that is fixed to the sleeve 105 with sandwiching the thrust plate 102 between the thrust cover 106 and the sleeve 105, a motor base 107 that sustains the sleeve 105, a core 108 having a radial protrusion that is formed with laminating a plurality of layers of a silicon steel plate and fixed to the motor base 107, and a coil 109 that is wound around the radial protrusion of the core 108.

A dynamic pressure groove is formed on either an outer circumferential surface of the shaft 101 or an inner circumferential surface of the sleeve 105, and a radial dynamic pressure bearing is constituted between the outer circumferential surface of the shaft 101 and the inner circumferential surface of the sleeve 105.

On the contrary, a thrust dynamic pressure bearing is constituted such that a groove, which generates dynamic pressure, is respectively formed on at least either one surface of the thrust plate 102 and the sleeve 105, which confront with each other, and at least either one surface of the thrust plate 102 and the thrust cover 106, which confront with each other.

Further, lubricant is filled into a void surrounded by the shaft 101, the thrust plate 102, the sleeve 105 and the thrust cover 106, and resulting in constituting a thrust dynamic pressure bearing.

Furthermore, an inner circumferential surface of the sleeve 105 is provided with a tapered section 110 at a top end portion of the sleeve 105 confronting the hub 103, wherein an inner diameter of the tapered section 110 increases in accordance with a direction toward a top end surface of the sleeve 105. By controlling an amount of lubricant in order to adjust liquid level of the lubricant to reach as high as a middle of the tapered section 110, the lubricant is prevented from leaking out of the spindle motor by an action of surface tension. In this connection, the tapered section 110 is a so-called taper seal section.

In the meanwhile, it is necessary for a total thickness of the conventional spindle motor shown in FIG. 6 to exceed a certain value, which is a sum of a thickness of a dynamic pressure bearing and a thickness d2 of a flat panel portion of the hub 103. In other words, the total thickness of the conventional spindle motor shown in FIG. 6 is necessary to be more than a total dimension in an axial direction of the shaft 101 that is a sum of thicknesses of the thrust cover 106 and the thrust plate 102 and a distance d1 added with the thickness d2, wherein the distance d1 is a distance between a top edge of a upper dynamic pressure groove and a bottom edge of a lower dynamic pressure groove.

It has been required for a spindle motor installed in a hard disc apparatus to be thinner in profile. However, in case that each thickness of the thrust cover 106 and the thrust plate 102 is thinned, the thrust dynamic pressure bearing is degraded in stiffness and accuracy.

Further, in case that the distance d1 between the dynamic pressure grooves is narrowed, the radial dynamic pressure bearing is deteriorated in stiffness, and resulted in degrading accuracy of radial run-out of the rotor 150R.

Furthermore, in case that a length of the tapered section 110 of the sleeve 105 in a longitudinal direction along the shaft 101 is shortened, the lubricant is easily affected by change of thermal expansion caused by temperature change, and resulting in leaking out when the liquid level of the lubricant exceeds the taper seal section 110 due to thermal expansion caused by high temperature.

On the contrary, in case of low temperature, the lubricant shrinks and disables to penetrate sufficiently into the radial dynamic pressure bearing section, and resulting in deteriorating accuracy of radial run-out of the radial dynamic pressure bearing or shortening life of the radial dynamic pressure bearing due to excessive load on the radial dynamic pressure bearing by possible damage to the shaft 101 and the sleeve 105 caused by hard contacting between them.

More, in case that the thickness d2 of the hub 103 is thinned, there exists a further problem such that stiffness of the rotor 150R is deteriorated.

In a hard disc apparatus, recording density of a hard disc installed in the hard disc apparatus is prevented from being improved in case that accuracy of radial run-out of a spindle motor to be installed in the hard disc apparatus is deteriorated and stiffness of each section of the spindle motor is degraded.

In order to improve the above-mentioned problems, the Japanese publication of unexamined patent applications No. 2002-54636 disclosed the bearing device of which profile was intended to be thinner. The bearing device is provided with the taper seal section that is formed on both the end surface of the sleeve, which confronts the hub, and the outer circumferential surface of the sleeve, which directly contacts with the end surface.

Generally, lubricant filled in a dynamic pressure bearing gradually evaporates and decreases in amount with time.

In the case of the bearing device disclosed in the Japanese publication of unexamined patent applications No. 2002-54636, the distance from the radial dynamic pressure bearing section to the taper seal section is extremely short. Therefore, the lubricant filled in the groove for generating dynamic pressure, which is provided in the taper seal section side, easily runs short in a minute due to the evaporation of the lubricant, and resulting in a problem such that the life of the radial dynamic pressure bearing is relatively short.

Further, the taper seal section provided in the outer circumferential area of the sleeve opens toward the upper surface of the stepped section of the sleeve, which is disposed under the taper seal section, so that the liquid level of the lubricant is hard to be confirmed visually when lubricant is filled in the bearing device while manufacturing a motor installed with the bearing device. Accordingly, there existed another problem such that filling work of lubricant is extremely hard.

SUMMARY OF THE INVENTION

Accordingly, in consideration of the above-mentioned problems of the prior arts, an object of the present invention is to provide a spindle motor, which enables to be thin in profile, long in life, and easy to manufacture.

In order to achieve the above object, the present invention provides, according to an aspect thereof, a spindle motor comprising a sleeve; a shaft being rotatably sustained by the sleeve in a radial direction through a dynamic pressure bearing containing lubricant; and a hub fixed to the shaft and having a raised section in a ring shape surrounding one end portion of the sleeve, the spindle motor is further characterized in that a taper seal section for the lubricant is provided between an outer circumferential surface of the one end portion of the sleeve and an inner circumferential surface of the raised section confronting the outer circumferential surface of the one end portion of the sleeve, wherein a gap between these surfaces increases in accordance with a distance from the one end portion of the sleeve, and that a reservoir for the lubricant is formed between an end surface of the one end portion of the sleeve and a surface of the hub confronting the end surface of the sleeve, wherein the end surface of the sleeve is in parallel with the surface of the hub with maintaining a prescribed gap between them.

Other object and further features of the present invention will be apparent from the following detailed description when read in conjunction with the accompanying drawings.

DETAILED DESCRIPTION OF THE PREFERRED EMBODIMENTS

First Embodiment

Figure 1:
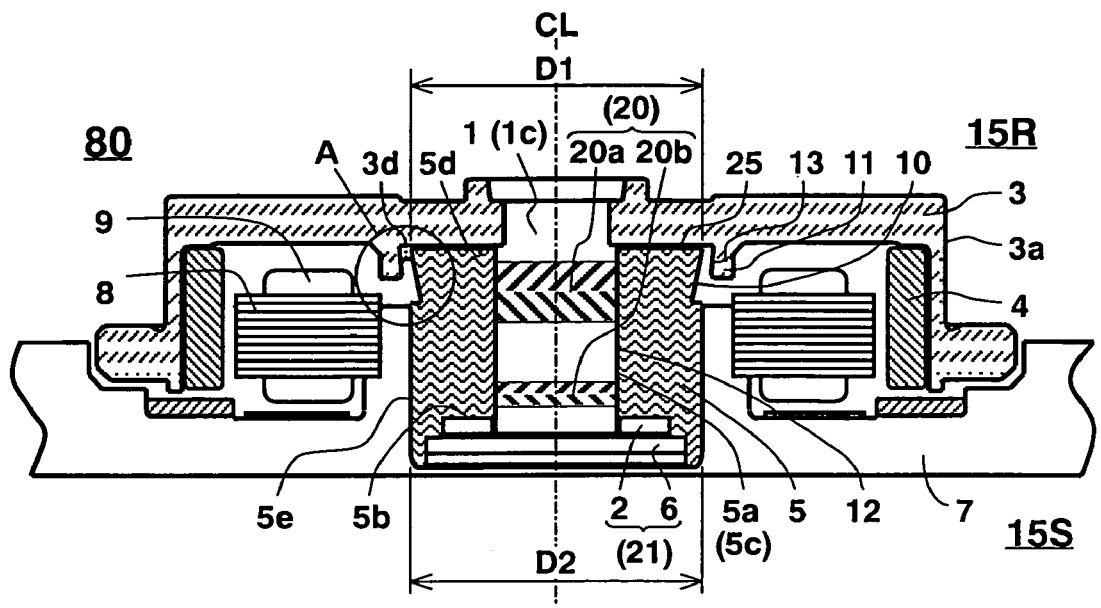
FIG. 1 is a cross sectional view of a spindle motor according to a first embodiment of the present invention.

FIG. 1 is a cross sectional view of a spindle motor according to a first embodiment of the present invention.

Figure 2:
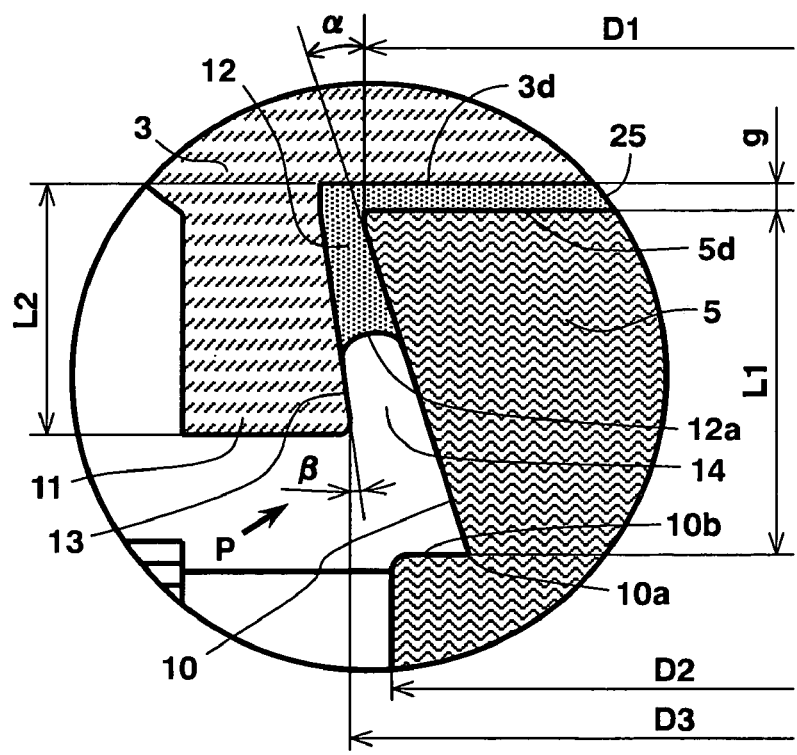
FIG. 2 is a fragmentary cross sectional view, with enlarging a part of the spindle motor indicated by a circle "A" in FIG. 1.

FIG. 2 is a fragmentary cross sectional view, with enlarging a part of the spindle motor indicated by a circle "A" in FIG. 1.

Figure 3:
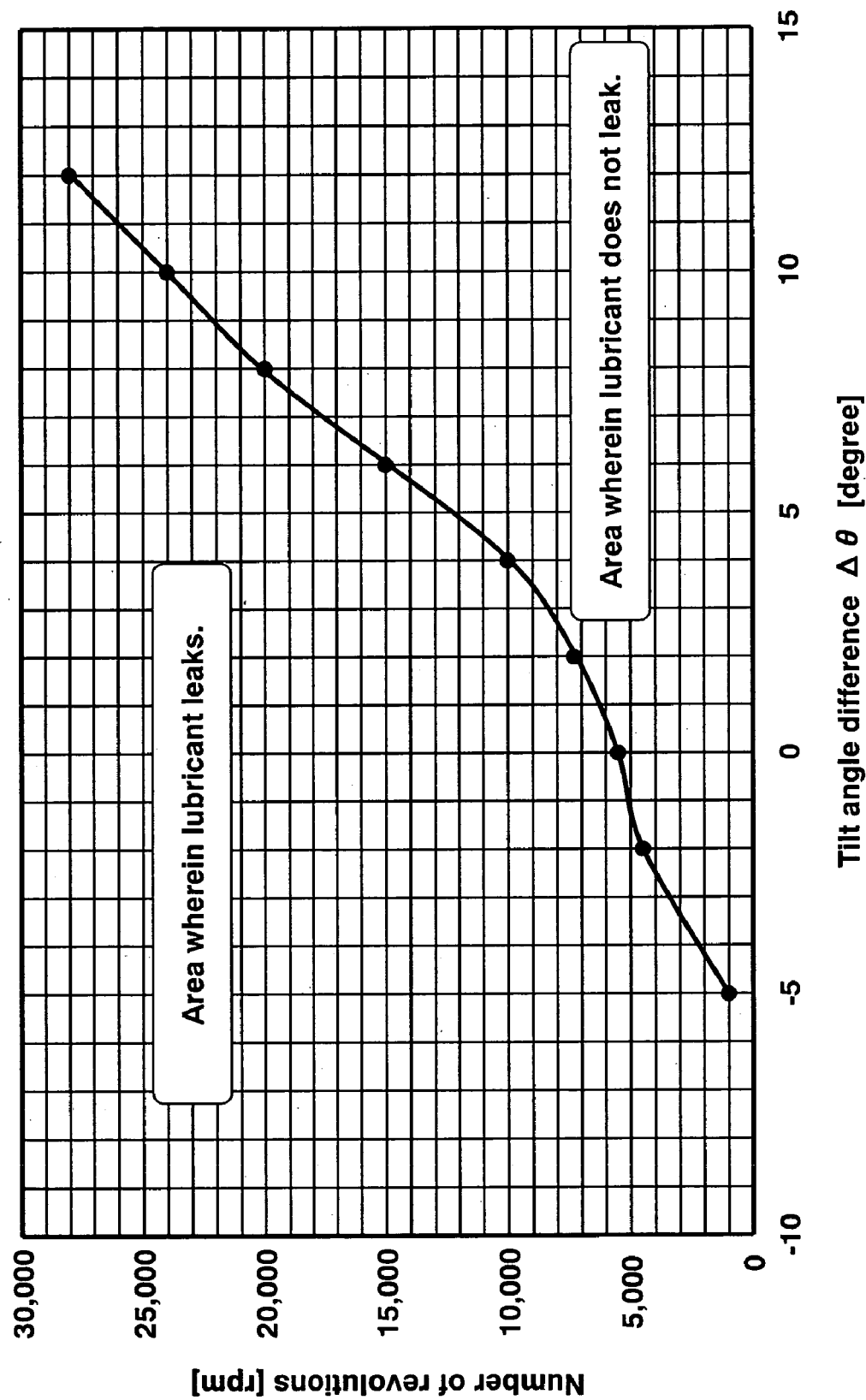
FIG. 3 is a graph exhibiting whether or not lubricant leaks out of the spindle motor shown in FIG. 1 with respect to tilt angle difference and a number of revolutions.

FIG. 3 is a graph exhibiting whether or not lubricant leaks out of the spindle motor shown in FIG. 1 with respect to tilt angle difference and a number of revolutions.

Figure 4:
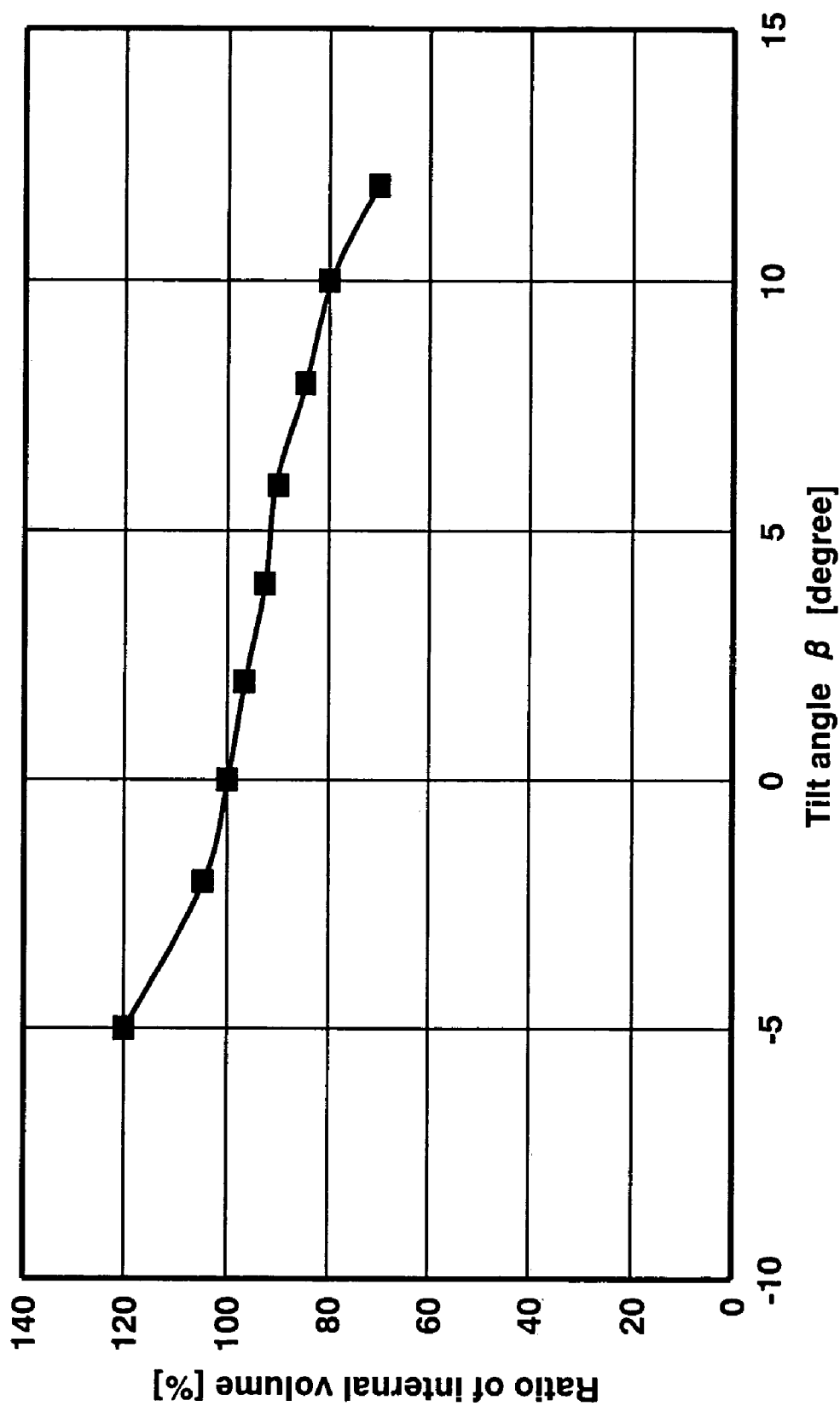
FIG. 4 is a graph exhibiting relationship between a tilt angle and a ratio of internal volume of the spindle motor shown in FIG. 1.

FIG. 4 is a graph exhibiting relationship between a tilt angle and a ratio of internal volume of the spindle motor shown in FIG. 1.

A spindle motor according to the first embodiment of the present invention is used in an apparatus installed with a hard disc (hereinafter referred to as hard disc apparatus) or a laser beam printer.

In FIGS. 1 and 2, a spindle motor 80 is composed of a rotor 15R and a stator 15S. The rotor 15R is further composed of a shaft 1, a thrust plate 2 in a ring shape that is fixed to an end portion of the shaft 1, and a hub 3 that is fixed to another end portion of the shaft 1.

The hub 3 is approximately formed in a cup shape having a flange 3a that is provided in an outer circumferential area of the hub 3 by cutting free-cutting steel and being nickel-plated. A magnet 4 in a ring shape, which is magnetized in multi magnetic poles, is fastened on an inner wall surface of the flange 3a.

On the other hand, the stator 15S is further composed of a motor base 7, a sleeve 5 in a cylindrical shape that is fixed to the motor base 7, a thrust cover 6 in disciform that is fixed to an opening section 5b provided on an end portion of the sleeve 5 with sandwiching the thrust plate 2 between the sleeve 5 and the thrust cover 6, a core 8 having a radial protrusion that is formed by laminating a plurality of layers of a silicon steel plate and fixed to the motor base 7, and a coil 9 that is wound around the radial protrusion of the core 8, wherein the shaft 1 is inserted into a center hole 5a of the sleeve 5 so as to be rotatable freely.

Dynamic pressure grooves 20a and 20b are formed on either an outer circumferential surface 1c of the shaft 1 or an inner wall surface 5c of the sleeve 5 with maintaining a prescribed distance between them in the axial direction of the shaft 1. A radial dynamic pressure bearing 20 is constituted between the outer circumferential surface 1c of the shaft 1 and the inner wall surface 5c of the sleeve 5 in conjunction with the dynamic pressure grooves 20a and 20b and lubricant 12 to be explained later, wherein the lubricant 12 is filled in a gap between the outer circumferential surface 1c and the inner wall surface 5c.

On the other hand, third and fourth dynamic pressure grooves. (not shown), which generate dynamic pressure when the rotor 15R rotates, are respectively formed on at least either one surface of the thrust plate 2 and the sleeve 5, which confront with each other, and at least either one surface of the thrust plate 2 and the thrust cover 6, which confront with each other.

A thrust dynamic pressure bearing 21 is constituted by the above-mentioned two surfaces, which are formed with the dynamic pressure groove, in conjunction with the lubricant 12 filled in a gap between the two surfaces.

Further, the lubricant 12 is filled and maintained in a void that is surrounded by the shaft 1, the thrust plate 2, the sleeve 5 and the thrust cover 6, and resulting in constituting the radial and thrust dynamic pressure bearings, wherein the lubricant 12 is fluid such as lube oil and magnetic fluid as well as liquid.

With referring to FIG. 2, a sealing structure for the lubricant 12 is detailed next.

An end surface 5d of the sleeve 5, which is an opposite end to the opening section 5b that confronts the thrust dynamic pressure bearing 21, is formed flatways.

Further, as shown in FIG. 2, an outer circumferential surface (hereinafter referred to as tapered section) 10 is provided on an outer surface 5e of the sleeve 5 in an area connecting to the end surface 5d, wherein an outer diameter of the tapered section 10 decreases in accordance with a distance from the end surface 5d toward the thrust dynamic pressure bearing 21. In case of the first embodiment of the present invention, a length L1 of the tapered section 10 in the axial direction of the sleeve 5 is 1.5 mm and a tilt angle α of the tapered section 10, which is an exterior angle between the tapered section 10 and a perpendicular line along a center axis of the sleeve 5 or center line CL, is 12 degrees.

On the other hand, a surface 3d of the hub 3, which confronts the end surface 5d of the sleeve 5, is formed flatways and in parallel with the end surface 5d while maintaining a prescribed gap "g" with respect to the end surface 5d.

Further, a raised section 11 in a ring shape is formed on a bottom surface of the hub 3. The raised section 11 is protruded toward the thrust dynamic pressure bearing 21 with surrounding the tapered section 10 of the sleeve 5.

Furthermore, an inner circumferential surface (hereinafter referred to as tapered section) 13 is formed on an inner wall surface of the raised section 11, wherein an inner diameter of the tapered section 13 decreases in accordance with a distance from the surface 3d toward the thrust dynamic pressure bearing 21.

More, a tilt angle β of the tapered section 13, which is an exterior angle between the tapered section 13 and a perpendicular line along the center line CL, is 8 degrees.

Moreover, the tapered section 10 of the sleeve 5 and the tapered section 13 of the raised section 11 forms a taper seal section 14, wherein a gap between the tapered sections 10 and 13 gradually broadens in accordance with a distance from the surface 3d toward the thrust dynamic pressure bearing 21.

In addition thereto, a reference sign D3 in FIG. 2 denotes a minimum diameter of the raised section 11.

As shown in FIG. 2, an end portion 10a of the tapered section 10 of the sleeve 5, which is disposed in a lowest portion of the tapered section 10 toward the thrust dynamic pressure bearing 21, is provided with a stepped section 10b of which diameter extends as far as an outer diameter D2 of the sleeve 5.

Further, an external diameter D1 of the end surface 5d of the sleeve 5 is formed so as to satisfy an inequality "D1≧D2".

By this configuration, a distance between the radial dynamic pressure bearing 20 and the taper seal section 14 enables to be sufficiently maintained. Consequently, affection of the lubricant 12 to the dynamic pressure bearings enables to be relieved even when an amount of the lubricant 12 decreases.

Assembling essential part of the spindle motor 80 having the above-mentioned configuration is explained next.

At first, the thrust plate 2 is force fitted to the end portion of the shaft 1. The shaft 1 mounted with the thrust plate 2 is inserted into the center hole 5a of the sleeve 5 from a bottom side of the sleeve 5 through the opening section 5b, and then the thrust cover 6 is affixed to the bottom end of the sleeve 5 so as to seal in the opening section 5b of the sleeve 5.

On the other hand, the other end portion of the shaft 1 protrudes through the top end of the sleeve 5, so that the hub 3 is force fitted to the other end portion of the shaft 1.

The lubricant 12 is injected into the taper seal section 14 from an arrow "P" direction after the shaft 1 is assembled into the hub 3. The injected lubricant 12 is filled in an area surrounding the thrust plate 2, a gap between the shaft 1 and the sleeve 5, the gap "g" between the surface 3d of the hub 3 and the end surface 5d of the sleeve 5, and the taper seal section 14. In the case of the taper seal section 14, as shown in FIG. 2, the lubricant 12 is filled as much as a fluidic surface 12a of the lubricant 12 reaches a middle of the taper seal section 14.

The taper seal section 14 is formed in such that a gap between the tapered sections 10 and 13 gradually broadens in accordance with a distance from a side filled with the lubricant 12 to another side not filled with the lubricant 12.

Consequently, the lubricant 12 never leaks out from the taper seal section 14 due to action of surface tension of the lubricant 12.

The gap "g" between the surface 3d of the hub 3 and the end surface 5d of the sleeve 5 forms a reservoir 25 for the lubricant 12. In case that the gap "g" is too narrow, resistance to the rotor 15R increases when the rotor 15R rotates. On the contrary, in case that the gap "g" is too wide, an amount of the lubricant 12 filled in the reservoir 25 increases excessively. The excessive amount of lubricant results in leaking out easily due to its own weight and centrifugal force applied to the lubricant 12 when the rotor 15R rotates. Consequently, the gap "g" is preferable to be within a range of 0.05 to 0.2 mm. More preferably, the gap "g" shall be within a range of 0.10 to 0.15 mm. By designating the gap "g" in the more preferable range, an appropriate amount of the lubricant 12 enables to be maintained in the reservoir 25 as well as the taper seal section 14.

It is necessary for a length or a protrusion height L2 of the raised section 11 from the surface 3d of the hub 3 in the axial direction of the shaft 1 to be a little shorter than a total length of adding the length L1 of the tapered section 10 in the axial direction to the gap "g" because of work for injecting the lubricant 12 from the arrow "P" direction. Consequently, in the case of the first embodiment of the present invention, the protrusion height L2 of the raised section 11 is designated to be 0.80 mm.

As mentioned above, the relationship between the tilt angle α of the tapered section 10 of the sleeve 5 and the tilt angle β of the tapered section 13 of the raised section 11 is "α>β". However, the inventor of the present invention studies the relationship between the tilt angles α and β and finds an appropriate range of them.

With referring to FIG. 3, an appropriate range of the tilt angles α and β is detailed next.

FIG. 3 is a graph exhibiting whether or not lubricant leaks out of the spindle motor shown in FIG. 1 with respect to tilt angle difference and a number of revolutions.

In FIG. 3, a horizontal line or the X-axis exhibits a tilt angle difference Δθ, that is, (α−β) and a vertical line or the Y-axis exhibits a number of revolutions of the rotor 15R.

Further, in FIG. 3, a right half region of the graph divided by a characteristic curve in a bold line exhibits an area in which lubricant does not leak out. On the contrary, a left half region of the graph divided by the characteristic curve exhibits another area in which lubricant leaks out.

Data of the graph are obtained by measuring a number of revolutions of the spindle motor 80 at a boundary value at which the lubricant 12 begins to leak out, while changing tilt angles α and β while regulating a range of the tilt angle a of the tapered section 10 of the sleeve 5 as "10°≦α≦15°". Reason why the range of the tilt angle α is regulated as "10°≦α≦15°" is based on that the range is within a practical dimensional range with respect to actual dimensions of the sleeve 5 and the hub 3.

In the first embodiment of the present invention, a numeric value of the tilt angles α and β is defined as follows: in case that a diameter of the tapered section 10 or 13 decreases along a direction from one side of the taper seal section 14 filled with the lubricant 12 to the other side not filled with the lubricant 12, a numeric value of the tilt angles α and β is positive. In other words, a numeric value of the tilt angles α and β shown in FIG. 2 is positive.

Further, in case that a diameter of the tapered section 10 or 13 is constant, a numeric value of the tilt angles α and β is zero degree (0°).

Furthermore, in case that a diameter of the tapered section 10 or 13 increases along the direction from one side of the taper seal section 14 filled with the lubricant 12 to the other side not filled with the lubricant 12, a numeric value of the tilt angles α and β is negative.

A number of revolutions of a hard disc installed in a common hard disc apparatus is 5400 rpm. Consequently, in order to prevent the lubricant 12 from leaking out at 5400 rpm, it is understood by the graph shown in FIG. 3 that a tilt angle difference Δθ shall be set to more than 0° (zero degree).

Further, a number of revolutions of a hard disc apparatus is apt to be increased recently. A hard disc apparatus of which a number of revolutions is 7200 rpm is gradually introduced into a market. In consideration of such a hard disc apparatus of 7200 rpm, a tilt angle difference Δθ is preferable to be more than 2°.

Furthermore, it is predicted that a hard disc apparatus of which a number of revolutions is 10000 rpm will be developed in near future. Consequently, it is most desirable that a tilt angle difference Δθ is more than 4° in consideration of that lubricant does not leak out even in such a hard disc apparatus of 10000 rpm.

In order to make an assembling process of the spindle motor 80 easier, as shown in FIG. 2, the minimum diameter D3 of the raised section 11 of the hub 3 is made larger than the external diameter D1 of the end surface 5d of the sleeve 5.

In case of the first embodiment of the present invention, the minimum diameter D3 and the external diameter D1 is designated to be 7.7 mm and 7.3 mm respectively.

In order to broaden the gap between the tapered section 10 and the tapered section 13 along the direction toward the thrust dynamic pressure bearing 21 under a condition such that the fluidic surface 12a of the lubricant 12 exists in the middle of the taper seal section 14, following five cases are considered:

(1) Both diameters of the tapered sections 10 and 13 increase along the direction toward the thrust dynamic pressure bearing 21. In other words, a numerical value of the tilt angles α and β is negative.
(2) The tapered section 10 is not tilted, that is, the tilt angle α is 0°, and a diameter of the tapered section 13 increases along the direction toward the thrust dynamic pressure bearing 21, that is, a numerical value of the tilt angle β is negative.
(3) A diameter of the tapered section 13 increases along the direction toward the thrust dynamic pressure bearing 21, that is, a numerical value of the tilt angle β is negative. On the contrary, a diameter of the tapered section 10 decreases, that is, a numerical value of the tilt angle α is positive.
(4) The tapered section 13 is not tilted, that is, the tilt angle β is 0°, and a diameter of the tapered section 10 decreases along the direction toward the thrust dynamic pressure bearing 21, that is, a numerical value of the tilt angles α is positive.
(5) Both diameters of the tapered sections 10 and 13 decrease along the direction toward the thrust dynamic pressure bearing 21. In other words, a numerical value of the tilt angles α and β is positive.

Since the lubricant 12 rotates in conjunction with the rotor 15R when the rotor 15R of the spindle motor 80 rotates, centrifugal force is applied to the lubricant 12. Consequently, it is most desirable for the tapered sections 10 and 13 to be in the configuration exhibited by the above-mentioned case number (4) or (5) by which the lubricant 12 never leaks out externally even when the centrifugal force is applied to the lubricant 12.

Further, in case that the tilt angle β of the tapered section 13 is increased more than necessary, internal volume of the taper seal section 14 is excessively reduced, and possibly resulting in causing a problem in reliability.

More accurately, in case that the spindle motor 80 of the first embodiment of the present invention is in the above-mentioned dimensions, that is, the tilt angle α of the tapered section 10 is 12°, the minimum diameter D3 of the raised section 11 of the hub 3 is 7.7 mm, and the external diameter D1 of the end surface 5d of the sleeve 5 is 7.3 mm, relationship between the tilt angle β of the tapered section 13 and internal volume of the taper seal section 14 is shown in FIG. 4.

FIG. 4 is a graph exhibiting relationship between a tilt angle and a ratio of internal volume of the spindle motor shown in FIG. 1. In FIG. 4, internal volume is exhibited by a ratio of internal volume at a certain tilt angle to internal volume when the tilt angle β is 0°, wherein the internal volume when the tilt angle β is 0° is defined as 100%.

As mentioned above, the lubricant 12 is injected into the taper seal section 14, wherein the fluidic surface 12a of the lubricant 12 is positioned so as to remain in the middle of the taper seal section 14. However, an initial position of the fluidic surface 12a fluctuates in manufacturing.

Further, the fluidic surface 12a varies by change of temperature or by evaporation of the lubricant 12. In order to maintain performance of the dynamic pressure bearings, the fluidic surface 12a must remain in the taper seal section 14 under any conditions.

It is found by the inventor of the present invention that fluctuation of a fluidic surface remarkably affects performance of the dynamic pressure bearing, and that reliability is hardly maintained in case internal volume becomes less than 80% with respect to the internal volume at 0° of the tilt angle β. Consequently, it is preferable for the tilt angle β that a ratio of internal volume is designated to be more than 80%. In this connection, it is understood by FIG. 4 that the tilt angle β is desirable to be equal to or less than 10° ($\beta \leq 10°$).

Further, in case that a groove in a spiral shape not shown is provided on either one surface of the end surface 5d of the sleeve 5 and the surface 3d of the hub 3 or both surfaces of the end surface 5d and the surface 3d so as to make the lubricant 12 move to a center of revolution side when the rotor 15R rotates, the lubricant 12 is more prevented from leaking out externally, and resulting in enabling to obtain the spindle motor 80 in higher reliability.

In the case of the spindle motor 80 according to the first embodiment of the present invention mentioned above, the external diameter D1 of the end surface 5d of the sleeve 5 is designated to be larger than the outer diameter D2 of the sleeve 5.

Further, the reservoir 25 for the lubricant 12 is provided between the end surface 5d of the sleeve 5 and the surface 3d of the hub 3 with maintaining the prescribed gap "g", wherein the reservoir 25 enables to be filled with the lubricant 12 sufficiently.

By the above-mentioned configuration, a most appropriate amount of lubricant 12 enables to be maintained in the spindle motor 80, and further the radial dynamic pressure bearing 20 and the taper seal section 14 is isolated from each other. Therefore, lack of lubricant never happens to the radial dynamic pressure bearing 20 although an amount of lubricant 12 is gradually reduced by evaporating with time.

Accordingly, the spindle motor 80 according to the first embodiment of the present invention exhibits-stable performance for a long time and is extremely long in life.

Second Embodiment

Figure 5:
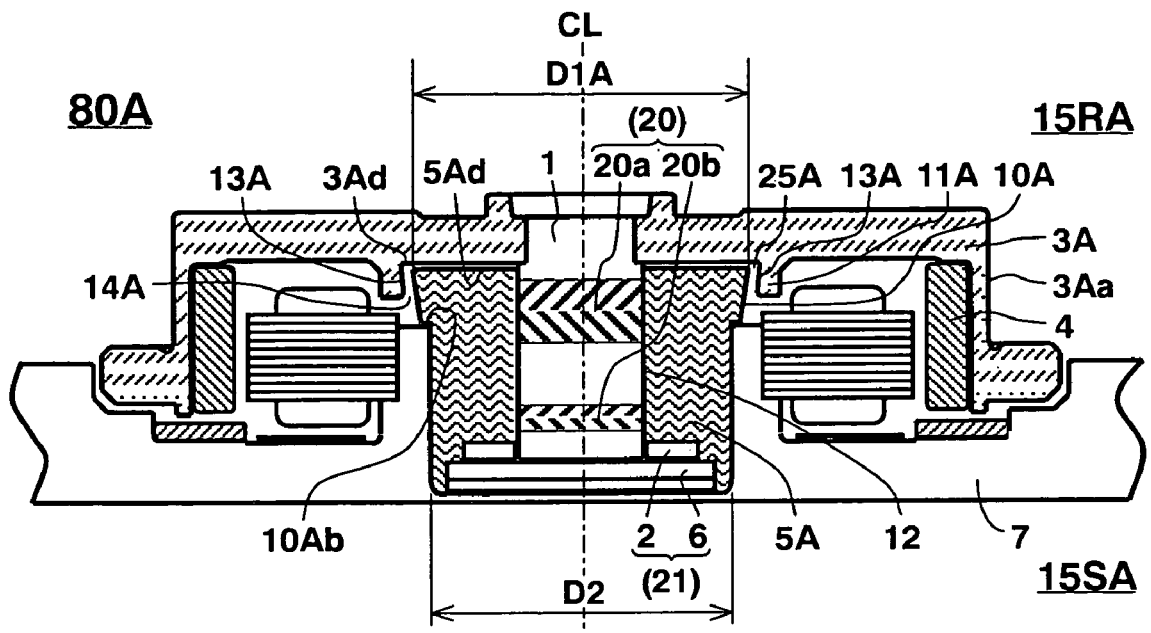
FIG. 5 is a cross sectional view of a spindle motor according to a second embodiment of the present invention.
Figure 6:
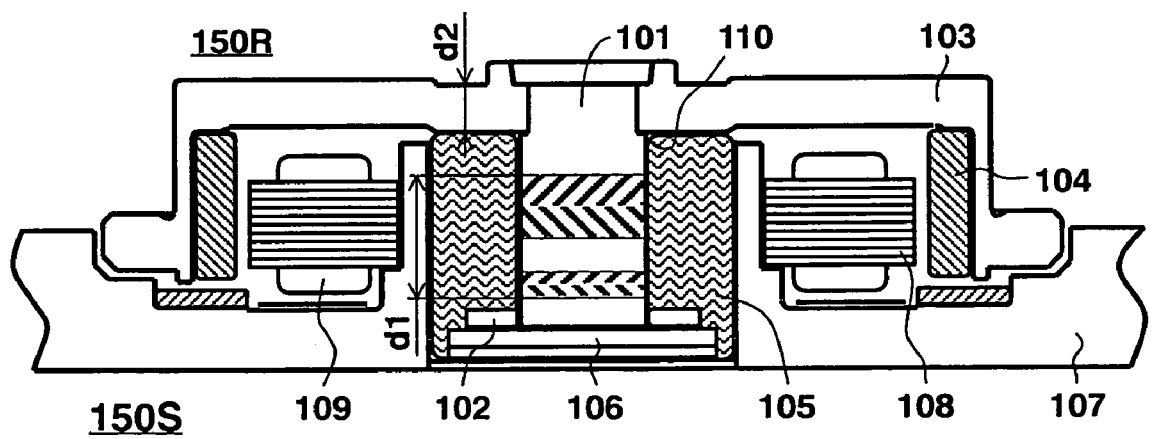
FIG. 6 is a cross sectional view of a conventional spindle motor according to the prior art.

FIG. 5 is a cross sectional view of a spindle motor according to a second embodiment of the present invention.

A spindle motor according to the second embodiment of the present invention is identical to the spindle motor 80 according to the first embodiment except for a hub and a sleeve, so that the same component is marked by the same reference sign and its detail is omitted.

In FIG. 5, a spindle motor 80A is composed of a rotor 15RA and the stator 15SA. The rotor 15RA is further composed of the shaft 1, the thrust plate 2, and a hub 3A. The hub 3A is provided with a flange 3Aa in an outer circumferential area.

On the other hand, the stator 15SA is further composed of the motor base 7, a sleeve 5A in a cylindrical shape that is fixed to the motor base 7, and the thrust cover 6.

Further, a tapered section 10A is provided on an outer circumferential surface of the sleeve 5A in an area connecting to an end surface 5Ad, wherein an outer diameter of the tapered section 10A decreases in accordance with a distance from the end surface 5Ad toward the thrust dynamic pressure bearing 21.

Furthermore, a surface 3Ad of the hub 3A, which confronts the end surface 5Ad of the sleeve 5A, is formed flatways and in parallel with the end surface 5Ad while maintaining a prescribed gap with respect to the end surface 5Ad.

More, a raised section 11A is formed on a bottom surface of the hub 3A in a ring shape. The raised section 11A is protruded toward the thrust dynamic pressure bearing 21 with surrounding the tapered section 10A of the sleeve 5A.

Moreover, a tapered section 13A is formed on an inner surface of the raised section 11A, wherein an inner diameter of the tapered section 13A decreases in accordance with a distance from the surface 3Ad toward the thrust dynamic pressure bearing 21.

In addition thereto, the tapered section 10A of the sleeve 5A and the tapered section 13A of the raised section 11A forms a taper seal section 14A.

In the case of the second embodiment, a stepped section 10Ab is provided at an end potion of the tapered section 10A of the sleeve 5A in the thrust dynamic pressure bearing 21 side, wherein an outer diameter of the stepped section 10Ab is larger than an outer diameter D2 of the sleeve 5A.

By the above-mentioned configuration, the spindle motor 80A exhibits the same effect as the spindle motor 80 of the first embodiment.

Further, an opening area for injecting the lubricant 12 into the taper seal section 14A is made broader than that of the first embodiment, so that the lubricant 12 enables to be injected more easily, and resulting in improving productivity more.

Furthermore, an external diameter D1A of the end surface 5Ad is larger than the outer diameter D2 of the sleeve 5A more in comparison with the external diameter D1 of the first embodiment, so that capacity of a reservoir 25A for the lubricant 12 is enlarged. Consequently, the spindle motor 80A according to the second embodiment also maintains performance for a long time and is extremely long in life.

According to the present invention, there is provided a spindle motor, which enables to be thinner in profile and exhibits excellent effects such as long in life and easy to manufacturing.

While the invention has been described above with reference to a specific embodiment thereof, it is apparent that many changes, modification and variations in materials and the arrangement of equipment and devices can be made without departing from the invention concept disclosed herein. For example, the first embodiment of the present invention is described in a motor in which the sleeve 5 and the thrust cover 6 is fix to the stator 15S side, and the shaft 1, the thrust plate 2 and the hub 3 is mounted on the rotor 15R side, that is, a so-called shaft rotational type motor. However, it is also applied for a motor in which the sleeve 5 and the thrust cover 6 is fix to the rotor 15R side, and the shaft 1, the thrust plate 2 and the hub 3 is mounted on the stator 15S side, that is, a so-called shaft fixed motor.

It should be understood that many modifications and adaptations of the invention will become apparent to those skilled in the art and it is intended to encompass such obvious modifications and changes in the scope of the claims appended hereto.

What is claimed is:

1. A spindle motor comprising:
   a sleeve;
   a shaft being rotatably sustained by the sleeve in a radial direction through a radial dynamic pressure bearing containing lubricant;
   a hub fixed to the shaft and having a raised section in a ring shape surrounding a first end portion of the sleeve;
   a thrust plate disposed in a second end portion of the sleeve opposite to the first end portion and fixed to the shaft confronting with the sleeve through lubricant;
   a thrust cover fixed to the sleeve in the second end portion confronting with the thrust plate through the lubricant;
   a taper seal section for the lubricant is provided between an outer circumferential surface of the first end portion of the sleeve and an inner circumferential surface of the raised section confronting the outer circumferential surface of the first end portion of the sleeve, wherein a gap between these surfaces increases in accordance with a distance from the first end portion of the sleeve;
   a reservoir for the lubricant formed between an end surface of the first end portion of the sleeve and a surface of the hub confronting the end surface of the sleeve, wherein the end surface of the sleeve is in parallel with the surface of the hub with maintaining a prescribed gap between them; and
   a thrust dynamic pressure bearing provided between the sleeve and the thrust plate or between the thrust plate and the thrust cover, wherein a thrust dynamic pressure bearing is not provided in the reservoir.

\* \* \* \* \*